United States Patent
Dixit et al.

(10) Patent No.: US 10,664,052 B2
(45) Date of Patent: May 26, 2020

(54) METHOD FOR PROVIDING FEEDBACK AND AN ELECTRONIC DEVICE THEREOF

(71) Applicant: Samsung Electronics Co., Ltd., Suwon-si, Gyeonggi-do (KR)

(72) Inventors: Achintya Dixit, Lucknow (IN); Prakhar Avasthi, Ghaziabad (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 15/153,051

(22) Filed: May 12, 2016

(65) Prior Publication Data

US 2017/0003753 A1    Jan. 5, 2017

(30) Foreign Application Priority Data

Jul. 1, 2015    (IN) .......................... 1994/DEL/2015

(51) Int. Cl.
*G06F 3/01*    (2006.01)
*G06F 3/0481*    (2013.01)
*H04M 1/725*    (2006.01)

(52) U.S. Cl.
CPC .............. *G06F 3/016* (2013.01); *G06F 3/017* (2013.01); *G06F 3/04817* (2013.01); *H04M 1/72563* (2013.01); *H04M 2250/22* (2013.01); *H04M 2250/62* (2013.01)

(58) Field of Classification Search
CPC ...... G06F 3/017; G06F 3/04817; G06F 3/016; H04M 1/72563; H04M 2250/22; H04M 2250/62
See application file for complete search history.

(56) References Cited

U.S. PATENT DOCUMENTS

| | | | |
|---|---|---|---|
| 8,219,151 B2 | 7/2012 | Park et al. | |
| 9,396,279 B1 * | 7/2016 | O'Donnell | G06F 16/986 |
| 2008/0034294 A1 * | 2/2008 | Ronkainen | G06F 1/1626 |
| | | | 715/702 |
| 2009/0144661 A1 * | 6/2009 | Nakajima | G06F 3/048 |
| | | | 715/835 |
| 2010/0069051 A1 * | 3/2010 | Vedurmudi | G06F 3/016 |
| | | | 455/414.3 |
| 2010/0231550 A1 | 9/2010 | Cruz-Hernandez et al. | |
| 2010/0277326 A1 | 11/2010 | Berk et al. | |

(Continued)

FOREIGN PATENT DOCUMENTS

WO    2010/088200 A1    8/2010

OTHER PUBLICATIONS

Indian Office Action dated Feb. 26, 2019, issued in the Indian Application No. 1994/DEL/2015.

*Primary Examiner* — Ajay M Bhatia
*Assistant Examiner* — Mong-Shune Chung
(74) *Attorney, Agent, or Firm* — Jefferson IP Law, LLP

(57) ABSTRACT

The embodiments herein provide a method for operating an electronic device. The method includes detecting a gesture performed in the electronic device. Further, the method includes identifying an item which is indicated by the gesture. Further, the method includes identifying at least one quantitative parameter associated with the item. Further, the method includes determining a degree based on the at least one quantitative parameter. Further, the method includes generating a feedback with the degree in response to the gesture.

11 Claims, 14 Drawing Sheets

(56) References Cited

U.S. PATENT DOCUMENTS

| | | | |
|---|---|---|---|
| 2012/0102200 A1* | 4/2012 | Rabii | G06F 9/5011 709/226 |
| 2012/0127071 A1 | 5/2012 | Jitkoff et al. | |
| 2014/0198068 A1 | 7/2014 | Lee et al. | |
| 2014/0198069 A1 | 7/2014 | Park et al. | |
| 2014/0285329 A1 | 9/2014 | Lee et al. | |
| 2015/0003814 A1* | 1/2015 | Miller | H04N 21/4583 386/297 |
| 2016/0132192 A1* | 5/2016 | Sutton | G06F 3/0482 715/719 |

* cited by examiner

METHOD FOR PROVIDING FEEDBACK AND AN ELECTRONIC DEVICE THEREOF

PRIORITY

This application claims the benefit under 35 U.S.C. § 119(a) of an Indian patent application filed in the Indian Patent Office on Jul. 1, 2015 and assigned Serial No. 1994/DEL/2015, the entire disclosure of which is hereby incorporated by reference.

TECHNICAL FIELD

The embodiments herein generally relate to electronic devices. More particularly to a mechanism for providing feedback to a user based on performance of the electronic device.

BACKGROUND

Portable electronic devices, such as gaming devices, mobile telephones, portable media players, portable digital assistants (PDAs), electronic book (eBook) reader devices, or the like, are becoming increasingly popular. These devices often include a screen for visually conveying information to a user. The user of such portable electronic devices can provide input via a user interface in order to select an object or icon on the screen. The user input is typically manifested visually on the screen (e.g., by highlighting the object or icon) thereby providing the user with a haptic or non-haptic feedback confirming that the user input was received and processed. Some non-limiting examples of non-haptic feedback can include audio signals, notification, alerts, or the like. Further, the haptic feedback is produced by vibrating a vibrator or motor included in the electronic device so that the user feels the vibration when the input is provided to the electronic device.

In the conventional systems, the haptic feedback on the electronic devices is used to simulate a sense of touch when the user interacts through the screen or other such input devices. But it does not contain much information about the object the user is interacting with. Further, the user is notified about the change in sensors or in any event by the haptic feedback. Further, the conventional systems may also generate different haptic feedback signatures for different events. However, at the time when the user is interacting with various objects on the screen, such haptic or non-haptic feedback may not provide any information about the object the user in interacting with.

Thus, there is a need in the art for a robust and simple method for providing feedback to a user based on performance of an electronic device.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method for providing feedback based on performance of an electronic device after detecting a gesture performed on an item by a user in the electronic device.

Another object of the embodiments herein is to provide a mechanism for determining performance aspect based on at least one quantitative parameter of the item and at least one relative parameter of the electronic device.

Another object of the embodiments herein is to provide a mechanism for generating a feedback to a degree in accordance to the performance aspect.

Yet another object of the embodiments herein is to provide a mechanism for identifying at least one relative parameter of the electronic device based on current state of the electronic device.

Yet another object of the embodiments herein is to provide a mechanism for identifying at least one quantitative parameter associated with the item.

Yet another object of the embodiments herein is to provide a mechanism for comparing the at least one quantitative parameter with the at least one relative parameter and provide response as the feedback to the user, where the duration of the feedback can be decided based on the quantitative parameter associated with the item.

Accordingly the embodiments herein provide a method for providing feedback based on performance of an electronic device. The method includes detecting a gesture performed on an item in the electronic device. Further, the method includes determining performance aspect based on at least one quantitative parameter of the item and at least one relative parameter of the electronic device. Further, the method includes generating a feedback to a degree in accordance to the performance aspect.

Accordingly the embodiments herein provide an electronic device for providing feedback based on performance. The electronic device includes a gesture detection unit configured to detect a gesture performed on an item in the electronic device. Further, the electronic device includes a controlling unit configured to determine performance aspect based on at least one quantitative parameter of the item and at least one relative parameter of the electronic device. Further, the electronic device includes a feedback generating unit configured to generate a feedback to a degree in accordance to the performance aspect.

Accordingly the embodiments herein provide a computer program product including a computer executable program code recorded on a computer readable non-transitory storage medium. The computer executable program code when executed causes the actions including detecting a gesture performed on an item in an electronic device. Further, the computer executable program code when executed causes the actions including determining performance aspect based on at least one quantitative parameter of the item and at least one relative parameter of the electronic device. Further, the computer executable program code when executed causes the actions including generating a feedback to a degree in accordance to the performance aspect.

Accordingly the embodiments herein provide a method for operating an electronic device. The method includes detecting a gesture performed in the electronic device. Further, the method includes identifying an item which is indicated by the gesture. Further, the method includes identifying at least one quantitative parameter associated with the item. Further, the method includes determining a degree based on the at least one quantitative parameter. Further, the method includes generating a feedback with the degree in response to the gesture.

Accordingly the embodiments herein provide an electronic device. The electronic device includes a gesture detection unit configured to detect a gesture performed in the electronic device. Further, the electronic device includes a controlling unit configured to identify an item which is indicated by the gesture, to identify at least one quantitative parameter associated with the item, and to determine a degree based on the at least one quantitative parameter. Further, the electronic device includes a feedback generating unit configured to generate feedback with the degree in response to the gesture.

Accordingly the embodiments herein provide a computer program product including a computer executable program code recorded on a computer readable non-transitory storage medium. The computer executable program code when executed causes the actions including detecting a gesture performed in the electronic device. Further, the computer executable program code when executed causes the actions including identifying an item which is indicated by the gesture. Further, the computer executable program code when executed causes the actions including determining a degree based on at least one quantitative parameter of the item and at least one relative parameter of the electronic device related to the at lest one quantitative parameter. Further, the computer executable program code when executed causes the actions including generating a feedback with the degree in response to the gesture.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
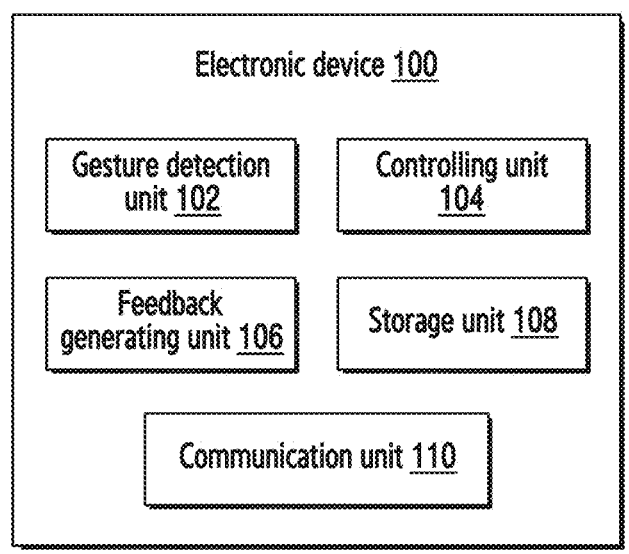
FIG. 1 illustrates a block diagram of an electronic device for providing feedback to a user based on performance of an electronic device, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for providing feedback based on performance of an electronic device. The method includes detecting a gesture performed on an item in the electronic device. Further, the method includes determining performance aspect based on at least one quantitative parameter of the item and at least one relative parameter of the electronic device.

In an embodiment, the method includes identifying the at least one relative parameter of the electronic device based on current state of the electronic device. Further, the method includes identifying the at least one quantitative parameter associated with the item. Further, the method includes determining the performance aspect based on a comparison between the at least one relative parameter of the electronic device and the at least one quantitative parameter associated with the item.

Further, the method includes generating a feedback to a degree in accordance to the performance aspect. In an embodiment, the feedback is, for example, a haptic feedback, a tactile feedback, an audio feedback, a visual feedback, an alert, a notification, or the like. In an embodiment, the feedback is dynamically selected based on the at least one relative parameter of the electronic device.

In an embodiment, the degree of the feedback indicates change in performance of the electronic device with respect to the item, where the degree varies in intensity, pattern, duration, or profile based on the item.

Unlike the conventional systems and methods, based on the item selected by the user, the appropriate quantitative parameter is calculated. Based on a comparison between the calculated quantitative parameter and the relative parameter, a response is provided as the feedback, to the user, in form of intensity or pattern. The duration of the feedback may be decided based on the calculated quantitative parameter. Further, the proposed method can enable the user to know about an application which the user is going to access before invoking the application, so that the user can decide whether to invoke the application based on the feedback provided by the electronic device. For example, before opening any application, the user gets to know whether the application consumes high RAM or low RAM based on the feedback generated.

Unlike the conventional systems and methods, instead of controlling the haptic feedback based on a haptic event which may be predefined and stored in the electronic device, the proposed invention can be used to find the relative parameter aspect of the item with which the user interacts and then provide the haptic feedback. The haptic feedback pattern described herein depends on the relative parameter and not on whether or not it is stored in the memory corresponding to a fixed event or action. The feedback is generated by touching different items in the electronic device which conveys additional information about relative parameters of the corresponding item through the intensity of the vibrations. The relative parameters of the item correspond to the parameters that influence the user experience in relation with the item. Furthermore, the proposed system and method can be implemented using existing infrastructure and may not require extensive setup and instrumentation.

Referring now to the drawings, and more particularly to FIGS. 1 through 14, where similar reference characters denote corresponding features consistently throughout the figures, there are shown preferred embodiments.

FIG. 1 illustrates a block diagram of an electronic device 100 for providing feedback to a user based on performance of the electronic device 100, according to embodiments as disclosed herein. The electronic device 100 can be, for example, a laptop, a desktop computer, a mobile phone, a smart phone, Personal Digital Assistants (PDAs), a tablet, a phablet, a consumer electronic device, a server, or any other electronic device.

In an embodiment, the electronic device 100 includes a gesture detection unit 102, a controlling unit 104, a feedback generating unit 106, a storage unit 108, and a communication unit 110. The gesture detection unit 102 can be configured to detect a gesture performed on an item in the electronic device 100. The items are displayed by the user interface of the electronic device 100 which can be interacted with by the user by touching, coming in close proximity, or hovering over the items. In an embodiment, the gesture can be, for example, a touch gesture, a hover gesture, or the like. In an embodiment, the item can be, for example, icons, media items, folders, network strength, web page, applications, other form of user interface items, or the like. The applications can be, for example, a message application, a call application, a music application, a calendar application, a Notepad application, a calculator application, a Wi-Fi application, a Bluetooth application, a reminder application, a camera application, a memo application, or any other applications.

The controlling unit 104 can be configured to identify at least one relative parameter of the electronic device 100 based on current state of the electronic device 100. In an example, the current state of the electronic device 100 may refer to, the amount of RAM consumed by the electronic device 100 at a time interval when the user selects the application to launch. In another example, the current state of the electronic device 100 may refer to, the file sharing queue size while the user tries to share the file with another user. In another example, the current state of the electronic device 100 may refer to, the number of folders which are currently copying or moving from one location to another location in the electronic device 100 while the user tries to copy or move the folder.

In an embodiment, the relative parameter can be, for example, an amount of RAM usage by the electronic device, a file sharing queue size, a size of available free memory, an available data bandwidth, a number of folders which are currently copying or moving from one location to another location, a number of missed calls, or the like. Further, the controlling unit 104 can be configured to identify at least one quantitative parameter associated with the item. In an embodiment, the quantitative parameter can be, for example, an amount of Random Access Memory (RAM) usage, a length of a media item, a size of the media item, a number of media items in a list, a number of contents in a folder, a number of web pages which are launched in browser, a size of the web page to be launched, a size of available free memory, or the like.

Further, the controlling unit 104 can be configured to determine performance aspect based on a comparison between the at least one relative parameter of the electronic device 100 and the at least one quantitative parameter associated with the item. The feedback generating unit 106 can be configured to generate a feedback to a degree in accordance to the performance aspect. The feedback generated depends on the relative parameter and not on whether or not it is stored in the storage unit corresponding to a fixed action. In an embodiment, the degree of the feedback indicates change in performance of the electronic device 100 with respect to the item, where the degree varies in intensity, pattern, duration, or profile based on the item. In an embodiment, the feedback is a haptic feedback, a tactile feedback, an audio feedback, a visual feedback, an alert, a notification, or the like. In an embodiment, the haptic feedback capabilities include use of actuators or an unbalanced rotatable mass to produce the haptic feedback which can vary in the intensity, pattern and duration in accordance to the user gesture. In an embodiment, the feedback is dynamically selected based on the relative parameters of the electronic device 100.

In an example, consider a scenario where the user tries to launch a game application (App). The quantitative parameter associated with the game application is the RAM consumption. The RAM consumption means an amount of RAM usage by the application. The relative parameter is the RAM consumption of the electronic device 100. the RAM consumption of the electronic device 100 means an amount of RAM usage by the electronic device 100. Initially, the user is unaware of amount of RAM the game application may consume. The user performs the gesture on the game application icon. After detecting the gesture, the RAM consumption associated with the game application is identified. Further, the RAM consumption of the electronic device 100 is identified. The performance aspect is determined based on the comparison between the RAM consumption of the electronic device 100 and the RAM consumption associated with the game application. Further, the feedback is generated to the degree in accordance with the performance aspect. The feedback can be modified based on the maximum amount of RAM the game application has been known to use by saving the RAM consumption aspect in its history. The game application having a history of consuming low RAM will generate a low intensity (i.e., degree) feedback when the current RAM consumption of the electronic device 100 is less. The game application having the history of consuming low RAM will generate a high intensity (i.e., degree) feedback when the current RAM consumption of the electronic device 100 is high.

In another example, consider a scenario where the user tries to open an image file or a video file. Further, when the user tries to open the image file or video file, they are unaware of the size or resolution of the image file or video file. Hence, they are unaware of the time the image file or video file might take to load, play, or display. If the image file or video file with more size is loaded when the current RAM consumption of the electronic device 100 is low, then it will generate the low intensity (i.e., degree) feedback whereas when the current RAM consumption of the electronic device 100 is high, the same image file or video file will generate high intensity (i.e., degree) feedback. Further, the user can be intimated by the feedback, about the size or resolution of the image file or video file the user is trying to access.

The storage unit 108 may include one or more computer-readable storage media. The storage unit 108 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 108 may, in some examples, be considered a non-transitory storage medium. The term "non-transitory" may indicate that the storage medium is not embodied in a carrier wave or a propagated signal. However, the term "non-transitory" should not be interpreted to mean that the storage unit 108 is non-movable. In some examples, the storage unit 108 can be configured to store larger amounts of information than the memory. In certain examples, a non-transitory storage medium may store data that can, over time, change (e.g., in Random Access Memory (RAM) or cache).

Further, the storage unit 108 can be configured to store the quantitative parameter of the item which can be referenced along with the stored relative parameter for the item for various scenarios in order to change the feedback reproduced in the form of intensity, pattern, duration of the feedback delivered to the user preemptively when the user tries to perform the gesture on the item on the user interface during the time interval starting from when proximity to the touch interface is identified and user finally touches the entity. The below table-1 shows a list of items, relative quantitative aspect, and quantitative aspect of the items.

TABLE 1

| Item | Quantitative parameter | Relative quantitative parameter | Scenario |
| --- | --- | --- | --- |
| APP icon | RAM consumption | Current RAM consumption of the | Opening application |

TABLE 1-continued

| Item | Quantitative parameter | Relative quantitative parameter | Scenario |
| --- | --- | --- | --- |
| File | Size | electronic device Size of sharing queue | File sharing |

The communication unit 110 can be configured for communicating with external devices via one or more networks, such as one or more wireless networks.

Unlike the conventional systems and methods, the proposed method allows the user to get the information about the quantitative parameter of the item based on the feedback generated depending upon the quantitative measurement. The feedback is generated by touching different items in the electronic device 100 thereby conveying additional information about relative parameter of the corresponding item through the intensity of the vibrations. The relative parameter of the item corresponds to the aspects that influence the user experience in relation with the item.

Unlike the conventional systems and methods, instead of identifying a haptic providing region and provide the haptic feedback when the user touches the haptic provided region as per the stored haptic for that region, the proposed invention identifies the quantitative parameter of the application which is selected by the user and provide the feedback on basis of the quantitative parameter. Further, instead of considering the selection of haptic regions and providing them with the pre-decided haptic feedback, the proposed invention provides a method for setting a local haptic feedback in a region or object of an application selected by a user.

The FIG. 1 shows a limited overview of the electronic device 100 but, it is to be understood that another embodiment is not limited thereto. Further, the electronic device 100 can include different units communicating among each other along with other hardware or software components. For example, the component can be, but not limited to, a process running in the electronic device, an executable process, a thread of execution, a program, or a computer. By way of illustration, both an application running on an electronic device 100 and the electronic device 100 can be the component.

Figure 2:
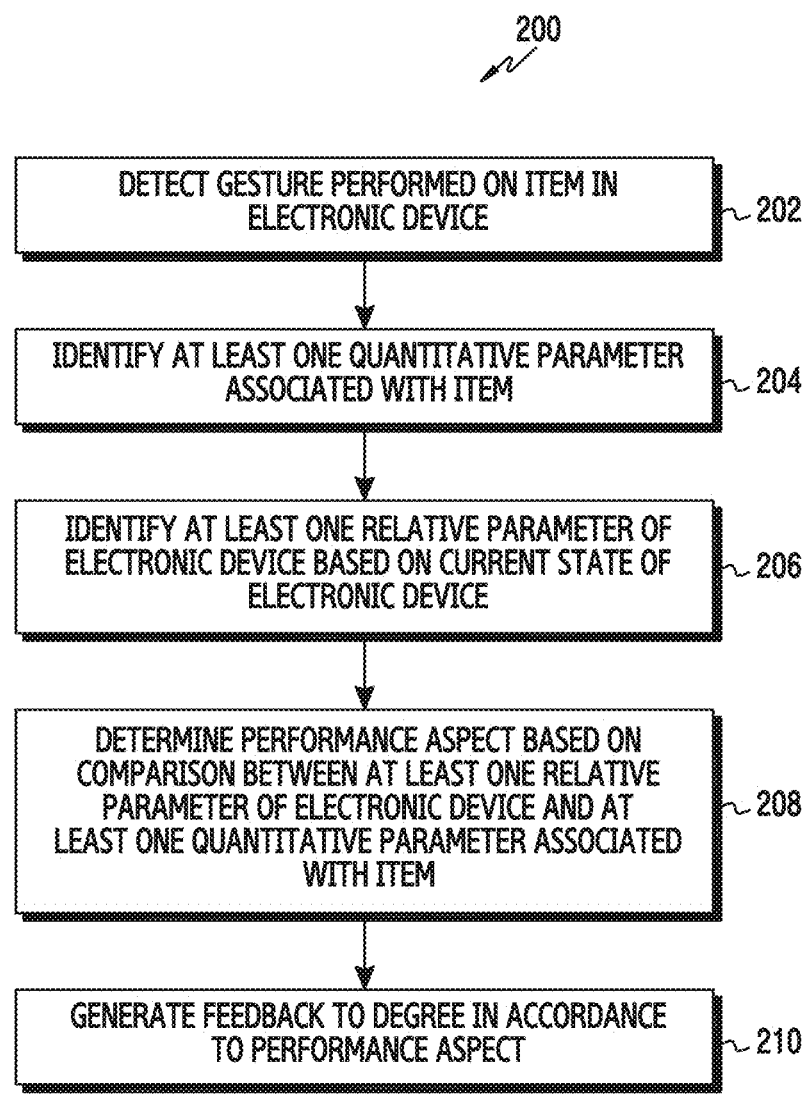
FIG. 2 is a flow diagram illustrating a method for providing feedback to the user based on performance of the electronic device, according to embodiments as disclosed herein.

FIG. 2 is a flow diagram illustrating a method 200 for providing feedback to the user based on performance of the electronic device 100, according to embodiments as disclosed herein.

At step 202, the method 200 includes detecting the gesture performed on the item in the electronic device 100. The method 200 allows the gesture detection unit 102 to detect the gesture performed on the item in the electronic device 100. The electronic device 100 detects the gesture performed on the item. In an embodiment, the gesture can be, for example, the touch gesture, the hover gesture, or the like. In an embodiment, the item can be, for example, icons, media items, folders, network strength, webpage, applications, or the like. The applications can be, for example, the message application, the call application, the music application, the calendar application, the Notepad application, the calculator application, the Wi-Fi application, the Bluetooth application, the reminder application, the camera application, the memo application, or any other applications.

At step 204, the method 200 includes identifying the quantitative parameters associated with the item. The method 200 allows the controlling unit 104 to identify the quantitative parameters associated with the item. The electronic device 100 identifies the quantitative parameters associated with the item. In an embodiment, the quantitative parameter can be, for example, the RAM consumption, the length of the media item, the size of the media item, number of media items in the list, number of contents in the folder, number of web pages which are launched in the browser, size of the web page to be launched, available free memory, or the like. In an example, the item and the quantitative parameter can include icon for the application and its average RAM consumption, icon for the image file and its size or resolution, icon for the video file and its length or size, icon for the folder and its number of contents, icon of playlist and its number of song, icon or button for lock and unlock of the electronic device 100 and the number of pending notifications, icon of network and the strength of connected signals, icon or link for the web page and its size to be downloaded or uploaded, link of the video file for application and its size, icon or button for page down or up and the length of page remaining to be scrolled down or up.

At step 206, the method 200 includes identifying the relative parameters of the electronic device 100 based on the current state of the electronic device 100. The method 200 allows the controlling unit 104 to identify the relative parameters of the electronic device 100 based on current state of the electronic device 100. The electronic device 100 identifies the relative parameters of the electronic device 100. In an embodiment, the relative parameter can be, for example, the RAM consumption, the file sharing queue size, the available free memory, the available data bandwidth, number of folders which are currently copying or moving from one location to another location, number of missed calls, or the like.

At step 208, the method 200 includes determining the performance aspect based on the comparison between the relative parameter of the electronic device 100 and the quantitative parameter associated with the item. The method 200 allows controlling unit 104 to determine the performance aspect based on the comparison between the relative parameter of the electronic device 100 and the quantitative parameter associated with the item. The electronic device 100 determines the performance aspect based on the comparison between the relative parameter of the electronic device 100 and the quantitative parameter associated with the item.

At step 210, the method 200 includes generating the feedback to the degree in accordance to the performance aspect. The method 200 allows the feedback generating unit 106 to generate the feedback to the degree in accordance with the performance aspect. The electronic device 100 generates the feedback to the degree in accordance with the performance aspect. In an embodiment, the feedback is the haptic feedback, the tactile feedback, the audio feedback, the visual feedback, the alert, the notification, or the combination of the same. In an embodiment, the feedback is dynamically selected based on the relative parameters of the electronic device 100. In an embodiment, the degree of the feedback indicates change in performance of the electronic device 100 with respect to the item, where the degree varies in the intensity, the pattern, the duration, the profile, or the combinations of the same based on the item.

In an embodiment, the feedback of variable intensity, pattern and duration for different items can provide a more real life experience of interaction to the user when the user provides the touch gesture on the item on the user interface. It will physically enable the user to experience the quantitative parameter of the item preemptively before its intended action so that the user will be aware about the effect the action might have if the user continues.

In an example, the performance aspect is determined based on the comparison between the RAM consumption of the electronic device 100 and the RAM consumption associated with the item selected by the user. The item having a history of consuming low RAM will generate a low intensity (i.e., degree) feedback when the current RAM consumption of the electronic device 100 is less. The game application having the history of consuming low RAM will generate a high intensity (i.e., degree) feedback when the current RAM consumption of the electronic device 100 is high.

In another example, if high percentage of the RAM of the electronic device 100 is already in use, then the application which consumes low RAM will generate feedback of high intensity as it will notify the user that the launching of the application will slow the device performance (i.e., performance aspect).

In the conventional systems, the electronic device 100 have predetermined mode of the haptic feedback which will be generated based on pre-determined events. The proposed invention generates the haptic feedback whenever the item is triggered by the user.

The various actions, acts, blocks, steps, or the like in the method 200 may be performed in the order presented, in a different order or simultaneously. Further, in some embodiments, some of the actions, acts, blocks, steps, or the like may be omitted, added, modified, skipped, or the like without departing from the scope of the invention.

Figure 3:
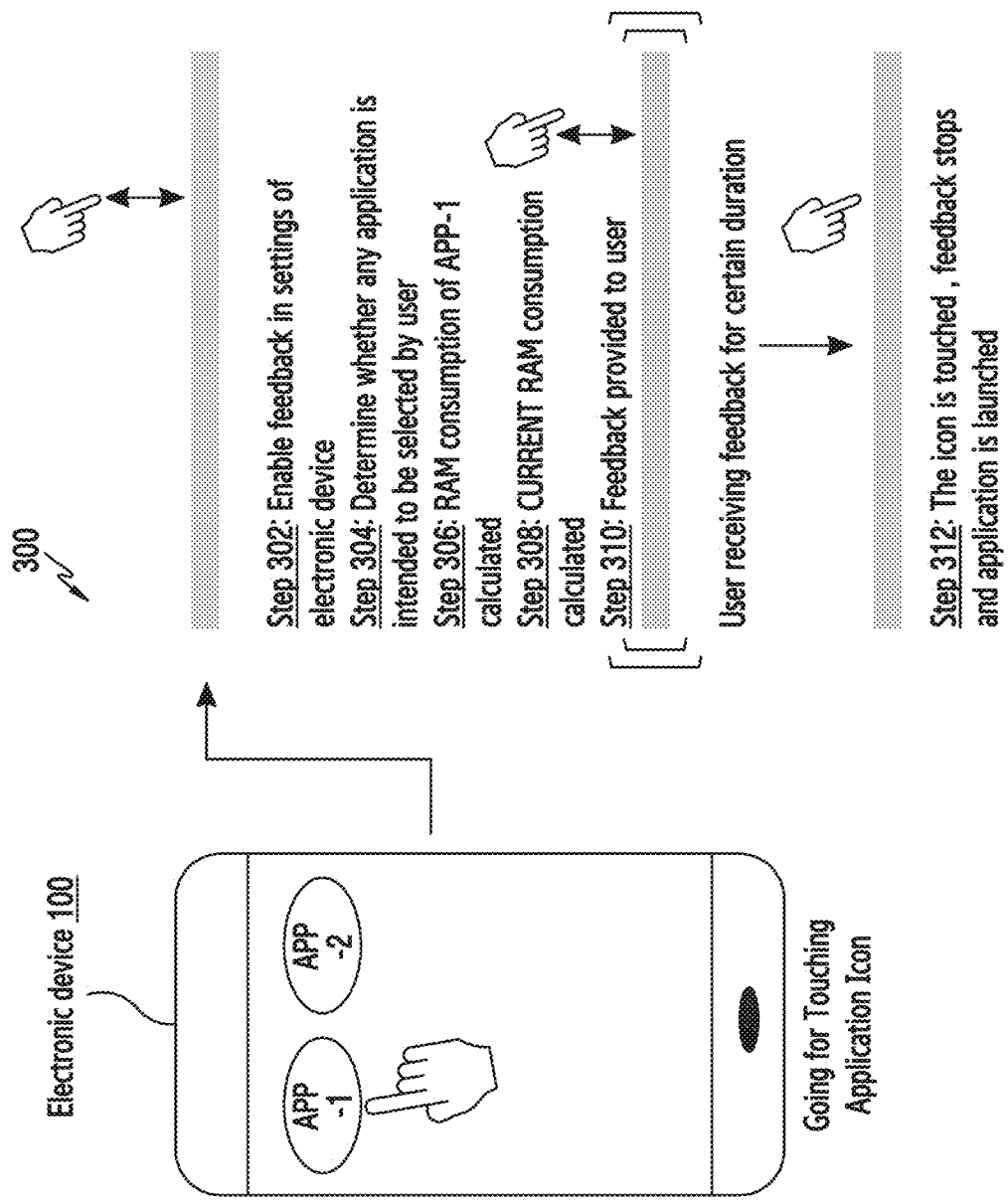
FIG. 3 illustrates an example scenario for providing feedback during opening an application (APP-1) by performing a gesture, according to embodiments as disclosed herein.

FIG. 3 illustrates an example system 300 for providing feedback during opening an application (APP-1) by performing a gesture, according to embodiments as disclosed herein. The system 300 includes the electronic device 100. The sequence of steps for providing feedback to the user are disclosed below:

At step 302: Enable feedback in the settings of the electronic device 100.

At step 304: Determine whether any item is intended to be selected by the user. For example, the item can be the application icon (APP-1) or the web page in the browser.

At step 306: The appropriate quantitative parameter based on the item is calculated. In an example, RAM consumption is the appropriate quantitative parameter of the APP-1; hence the RAM consumption is calculated. In another example, the size of the webpage to be loaded in the browser is the appropriate quantitative parameter for the webpage.

At step 308: The appropriate relative parameter is selected for reference based on the item. In an example, for the APP-1 as shown in the FIG. 3, the current RAM consumption of the electronic device 100 is the appropriate relative parameter. In another example, in case of the webpage, the available data bandwidth is the appropriate relative parameter.

At step 310: The degree of feedback is calculated by the comparison of the quantitative parameter and the relative parameter for the item selected by the user. Further, the user receives the feedback for the certain duration. In an embodiment, the feedback is generated with peculiarity which is calculated to give response or to notify the user. In an example, if the APP's-1 RAM consumption is less but the current RAM consumption of the electronic device 100 is high, then the high degree of feedback is provided to the user, whereas if the APP's-1 RAM consumption is high but the current RAM consumption of the electronic device 100 is low, then the low degree of feedback is provided to the user. In another example, when the available data bandwidth is high then while loading a light weight webpage will give low degree of feedback but when the data bandwidth is low then while loading the same light weight webpage will generate the high degree of feedback. In an embodiment, in case of low battery situation, the vibration feedback will change to either visual feedback or audio feedback. In an example, the visual experience can be changed by FADING of icons or other items when the user interacts with them to replace the feedback provided to the user.

At step 312: If the item icon (APP-1 icon) is touched by the user then the feedback stops and the item (APP-1 icon) is launched.

Figure 4:
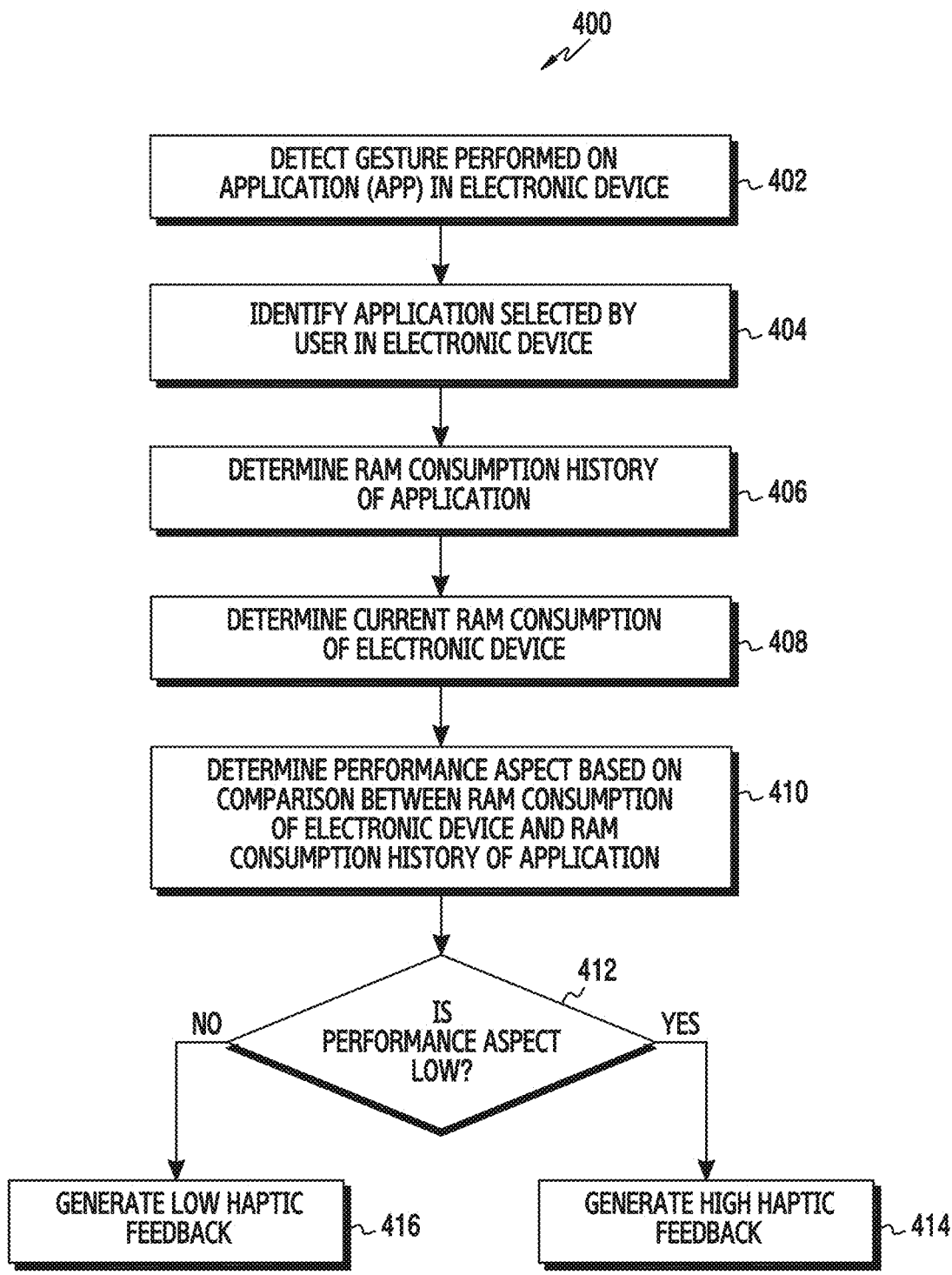
FIG. 4 is a flow diagram illustrating a method for providing feedback during opening the application by performing the gesture, according to embodiments as disclosed herein.

FIG. 4 is a flow diagram illustrating a method 400 for providing feedback during opening the application by performing the gesture, according to embodiments as disclosed herein. At step 402, the method 400 includes detecting the gesture performed on the application (APP) (or at the proximity of the application) in the electronic device 100. The method 400 allows the gesture detection unit 102 to detect the gesture performed on the application (or at the proximity of the application) in the electronic device 100. The electronic device 100 detects the gesture performed on the application (or at the proximity of the application).

At step 404, the method 400 includes identifying the application selected by the user in the electronic device 100. The method 400 allows the controlling unit 104 to identify the application selected by the user in the electronic device 100. The electronic device 100 identifies the application selected by the user. At step 406, the method 400 includes determining the RAM consumption history of the application. The method 400 allows the controlling unit 104 to determine the RAM consumption history of the application. The electronic device 100 determines the RAM usage history of the application. At step 408, the method 400 includes determining the current RAM consumption of the electronic device 100. The method 400 allows the controlling unit 104 to determine the current RAM consumption of the electronic device 100. The electronic device 100 determines the current RAM usage of the electronic device 100.

At step 410, the method 400 includes determining the performance aspect based on the comparison between the RAM consumption of the electronic device 100 and the RAM consumption history of the application. The method 400 allows the controlling unit 104 to determine the performance aspect based on the comparison between the RAM consumption of the electronic device 100 and the RAM consumption history of the application. The electronic device 100 determines the performance aspect based on the comparison between the RAM usage of the electronic device 100 and the RAM usage history of the application.

If it is determined, at step 412, that the performance aspect is low, then at step 414, the method 400 includes generating high degree of feedback. The method 400 allows the feedback generating unit 106 to generate high degree of feedback. The electronic device 100 generates high degree of feedback. If it is determined, at step 412, that the performance aspect is not low, then at step 416, the method 400 includes generating low degree of feedback. In an embodiment, the performance aspect may be measured as high or low based on the determination that the performance aspect is above or below a predefined threshold level. The method 400 allows the feedback generating unit 106 to generate low degree of feedback. The electronic device 100 generates low degree of feedback.

The various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
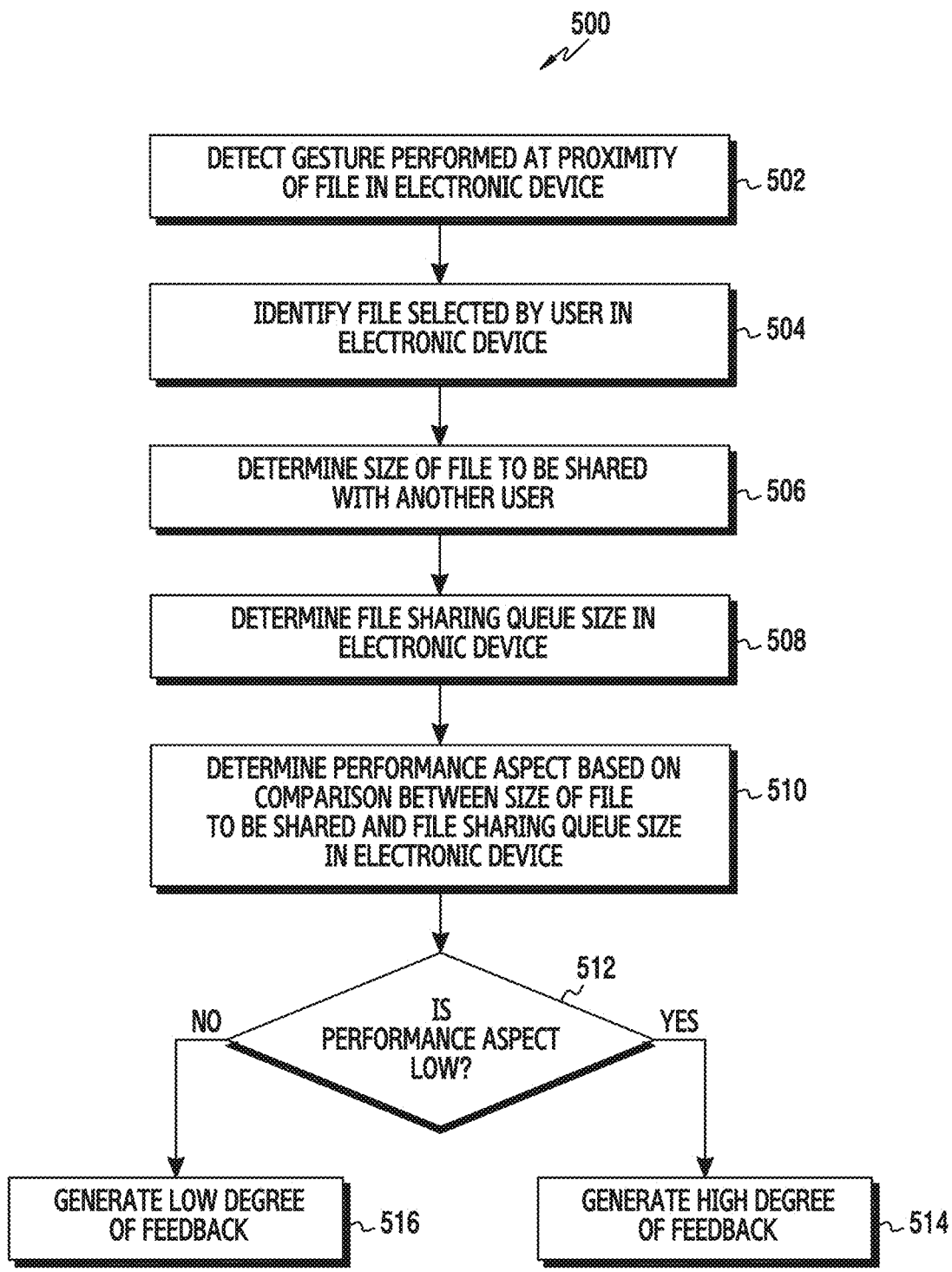
FIG. 5 is a flow diagram illustrating a method for providing feedback during selecting a file, by the user, to be shared with another user, according to embodiments as disclosed herein.

FIG. 5 is a flow diagram illustrating a method 500 for providing feedback during selecting a file, by the user, to be shared with another user, according to embodiments as disclosed herein. At step 502, the method 500 includes detecting the gesture at the proximity of the file in the electronic device 100. The method 500 allows the gesture detection unit 102 to detect the gesture at the proximity of the file in the electronic device 100. The electronic device 100 detects the gesture at the proximity of the file.

At step 504, the method 500 includes identifying the file selected by the user in the electronic device 100. The method 500 allows the controlling unit 104 to identify the file selected by the user in the electronic device 100. The electronic device 100 identifies the file selected by the user. At step 506, the method 500 includes determining the size of the file to be shared with another user. The method 500 allows the controlling unit 104 to determine the size of the file to be shared with another user. The electronic device 100 determines the size of the file to be shared with another user. At step 508, the method 500 includes determining the file sharing queue size in the electronic device 100. The method 500 allows the controlling unit 104 to determine the file sharing queue size in the electronic device 100. The electronic device 100 determines the file sharing queue size in the electronic device 100.

At step 510, the method 500 includes determining the performance aspect based on the size of the file and the file sharing queue size in the electronic device 100. The method 500 allows the controlling unit 104 to determine the performance aspect based on the comparison between the size of the file and the file sharing queue size in the electronic device 100. The electronic device 100 determines the performance aspect based on the comparison between the size of the file and the file sharing queue size in the electronic device 100.

If it is determined, at step 512, that the performance aspect is low, then at step 514, the method 500 includes generating high degree of feedback. The method 500 allows the feedback generating unit 106 to generate high degree of feedback. The electronic device 100 generates high degree of feedback. If it is determined, at step 512, that performance aspect is not low, then at step 516, the method 500 includes generating low degree of feedback. The method 500 allows the feedback generating unit 106 to generate low degree of feedback. The electronic device 100 generates low degree of feedback. In an embodiment, the performance aspect with a threshold (T), related to file sharing queue in the electronic device 100, may be defined. If the file sharing queue size is less occupied (i.e., below T) but the file-1 whose size is more than the average size of the files currently in the file sharing queue then the feedback generating unit 106 may generate the low degree of feedback. Further, when the file sharing queue is highly occupied (i.e., above T) but the file-1 whose size is less than the average size of the files currently in the file sharing queue then the feedback generating unit 106 may generate high degree of feedback. Further, the user may receive the feedback for certain duration.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
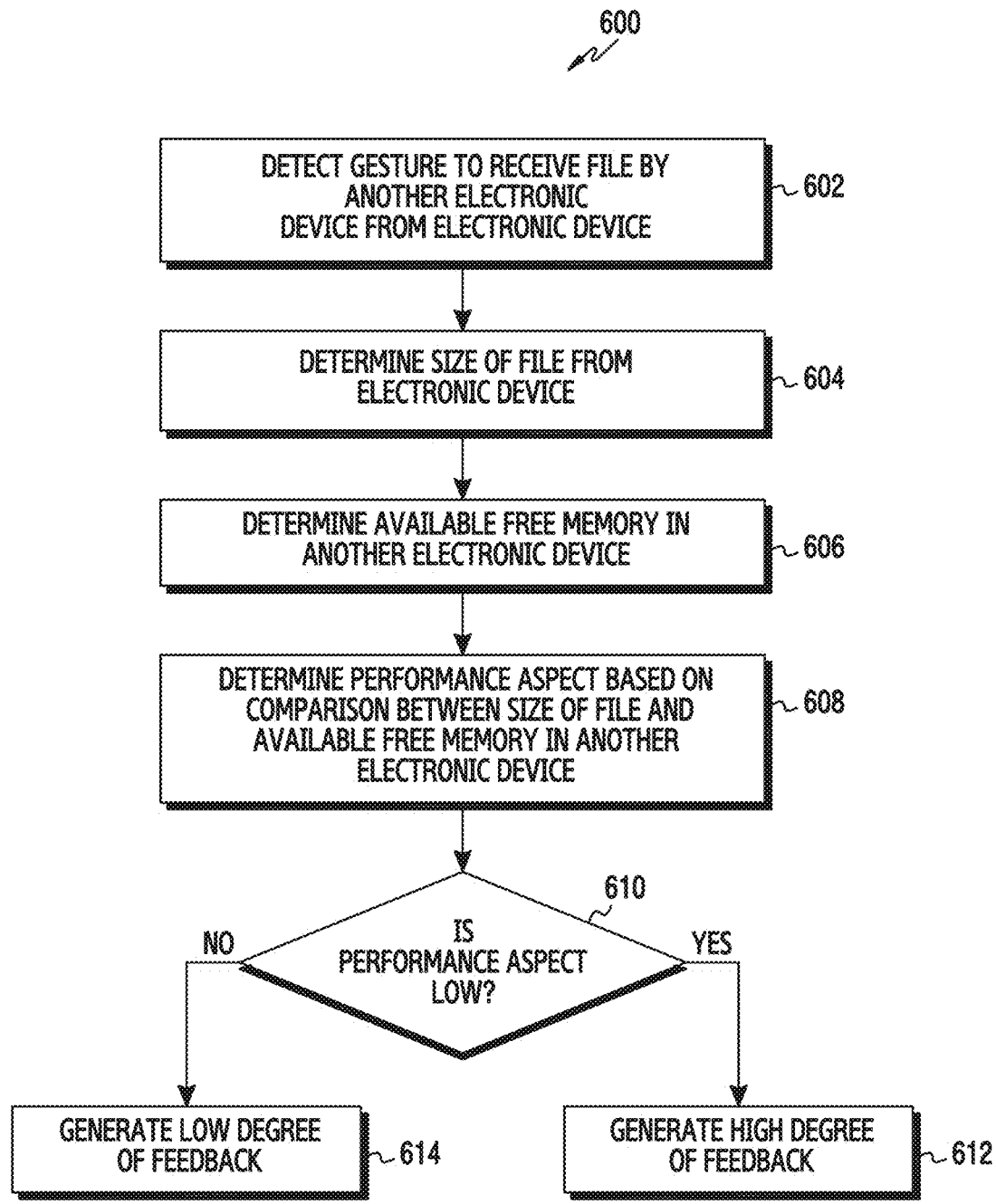
FIG. 6 is a flow diagram illustrating a method for providing feedback during receiving the file from the electronic device, according to embodiments as disclosed herein.

FIG. 6 is a flow diagram illustrating a method 600 for providing feedback during receiving the file from the electronic device 100, according to embodiments as disclosed herein.

At step 602, the method 600 includes receiving the file by another electronic device from the electronic device 100.

At step 604, the method 600 includes determining the size of the file received from the electronic device 100. The method 600 allows the controlling unit 104 to determine the size of the file received from the electronic device 100. The electronic device 100 determines the size of the file received from the electronic device 100. At step 606, the method 600 includes determining the available free memory in another electronic device. The method 600 allows the controlling unit 104 to determine the available free memory in another electronic device. The electronic device 100 determines the available free memory in another electronic device.

At step 608, the method 600 includes determining the performance aspect based on a comparison between the size of the file and the available free memory in another electronic device. The method 600 allows the controlling unit 104 to determine the performance aspect based on the comparison between the size of the file and the available free memory in another electronic device. The electronic device 100 determines the performance aspect based on the comparison between the size of the file and the available free memory in another electronic device.

If it is determined, at step 610, that the performance aspect is low, then at step 610, the method 600 includes generating the high degree of feedback. The method 600 allows the feedback generating unit 106 to generate the high degree of feedback. The electronic device 100 generates the high degree of feedback. If it is determined, at step 610, that the performance aspect is not low, then at step 612, the method 600 includes generating the low degree of feedback. The method 600 allows the feedback generating unit 106 to generate the low degree of feedback. The electronic device 100 generates the low degree of feedback.

In an embodiment, the high degree of feedback is generated for the file with less size and when the available memory in another electronic device is less. Further, the low degree of feedback is generated for the file with more size and when the available memory in another electronic device is more. In an embodiment, the performance aspect with a threshold (T), related to the available memory in another electronic device, may be defined. The threshold may be defined to assess the impact of the file storage in the available memory. If it is assessed that the impact of the file storage will be such that the total available memory after the storage of the file is reduced below the threshold T, a high degree of feedback may be generated by the feedback generating unit 106, indicating a low performance aspect. Further, the user may receive the feedback for certain duration.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
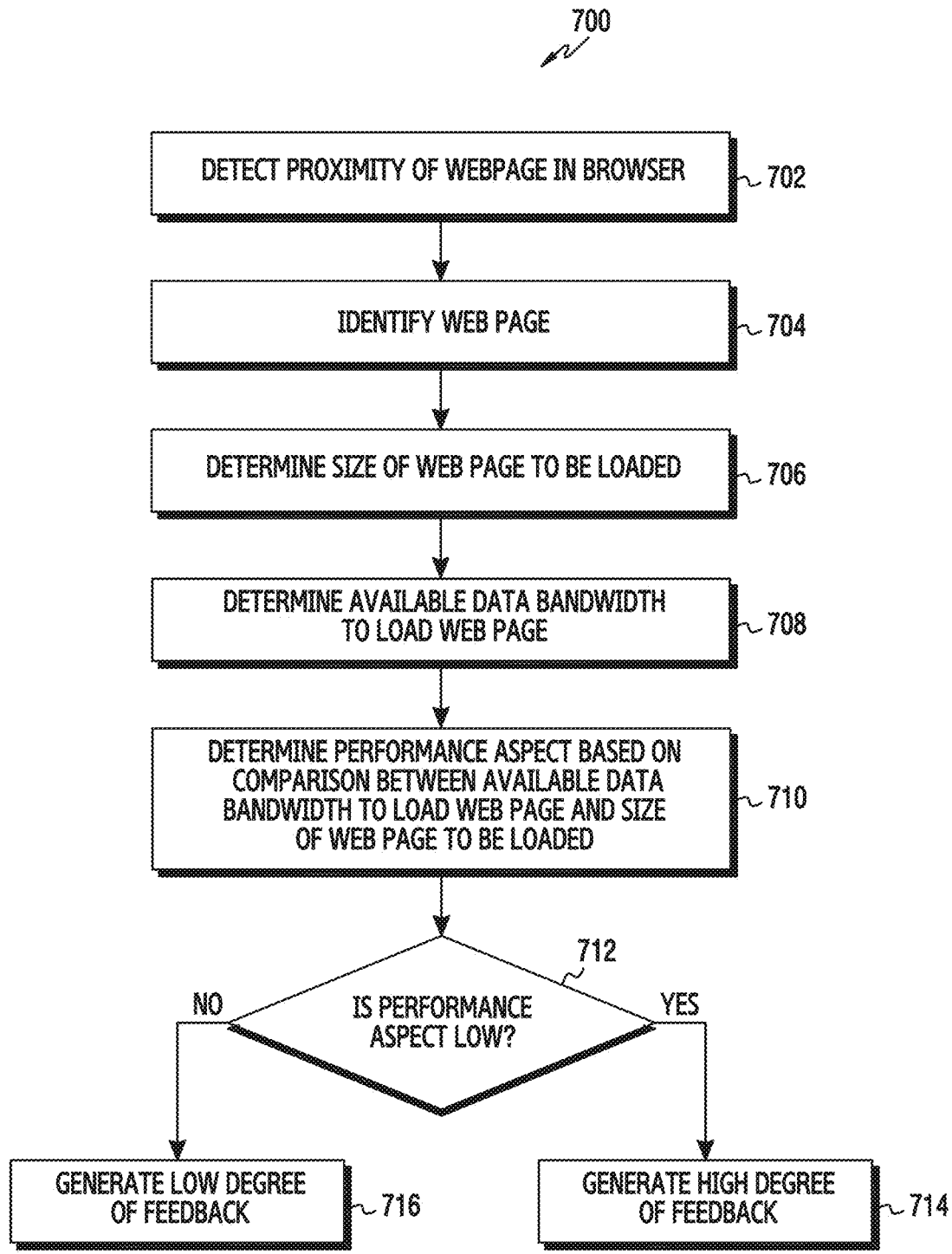
FIG. 7 is a flow diagram illustrating a method for providing feedback during launching a web page in a browser, according to embodiments as disclosed herein.

FIG. 7 is a flow diagram illustrating a method 700 for providing feedback during launching a web page in a browser, according to embodiments as disclosed herein. At step 702, the method 700 includes detecting proximity of the web page in the browser. The method 700 allows the gesture detection unit 102 to detect the proximity of the web page in the browser. The electronic device 100 detects the proximity of the web page in the browser.

At step 704, the method 700 includes identifying the web page. The method 700 allows the controlling unit 104 to identify the web page. The electronic device 100 identifies the web page. At step 706, the method 700 includes determining the size of the web page to be loaded. The method 700 allows the controlling unit 104 to determine the size of the web page to be loaded. The electronic device 100 determines the size of the web page to be loaded. At step 708, the method 700 includes determining the available data bandwidth to load the web page. The method 700 allows the controlling unit 104 to determine the available data bandwidth to load the web page. The electronic device 100 determines the available data bandwidth to load the web page.

At step 710, the method 600 includes determining the performance aspect based on a comparison between the available data bandwidth to load the web page and the size of the web page to be loaded. The method 700 allows the controlling unit 104 to determine the performance aspect based on a comparison between the available data bandwidth to load the web page and the size of the web page to be loaded. The electronic device 100 determines the performance aspect based on a comparison between the available data bandwidth to load the web page and the size of the web page to be loaded.

If it is determined, at step 712, that the performance aspect is low, then at step 714, the method 700 includes generating the high degree of feedback even when the size of the web page to be loaded is less. The method 700 allows the feedback generating unit 106 to generate the high degree of feedback even when the size of the web page to be loaded is less. The electronic device 100 generates the high degree of feedback even when the size of the web page to be loaded is less. If it is determined, at step 712, that the performance aspect is not low, then at step 716, the method 700 includes generating the low degree of feedback even when the size of the web page to be loaded is more. The method 700 allows the feedback generating unit 106 to generate the low degree of feedback even when the size of the web page to be loaded is more. The electronic device 100 generates the low degree of feedback even when the size of the web page to be loaded is more.

In an embodiment, the performance aspect with a threshold level of "T" MB may be defined, for the available data bandwidth to load the web page. The threshold may be defined to assess the impact of the loading of the webpage, on the available data bandwidth. If it is assessed that the impact of the loading of the webpage will be such that the total available bandwidth is reduced below the threshold "T" MB, a high degree of feedback may be generated by the feedback generating unit 106. Further, the user may receive the feedback for certain duration.

The various actions, acts, blocks, steps, or the like in the method 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
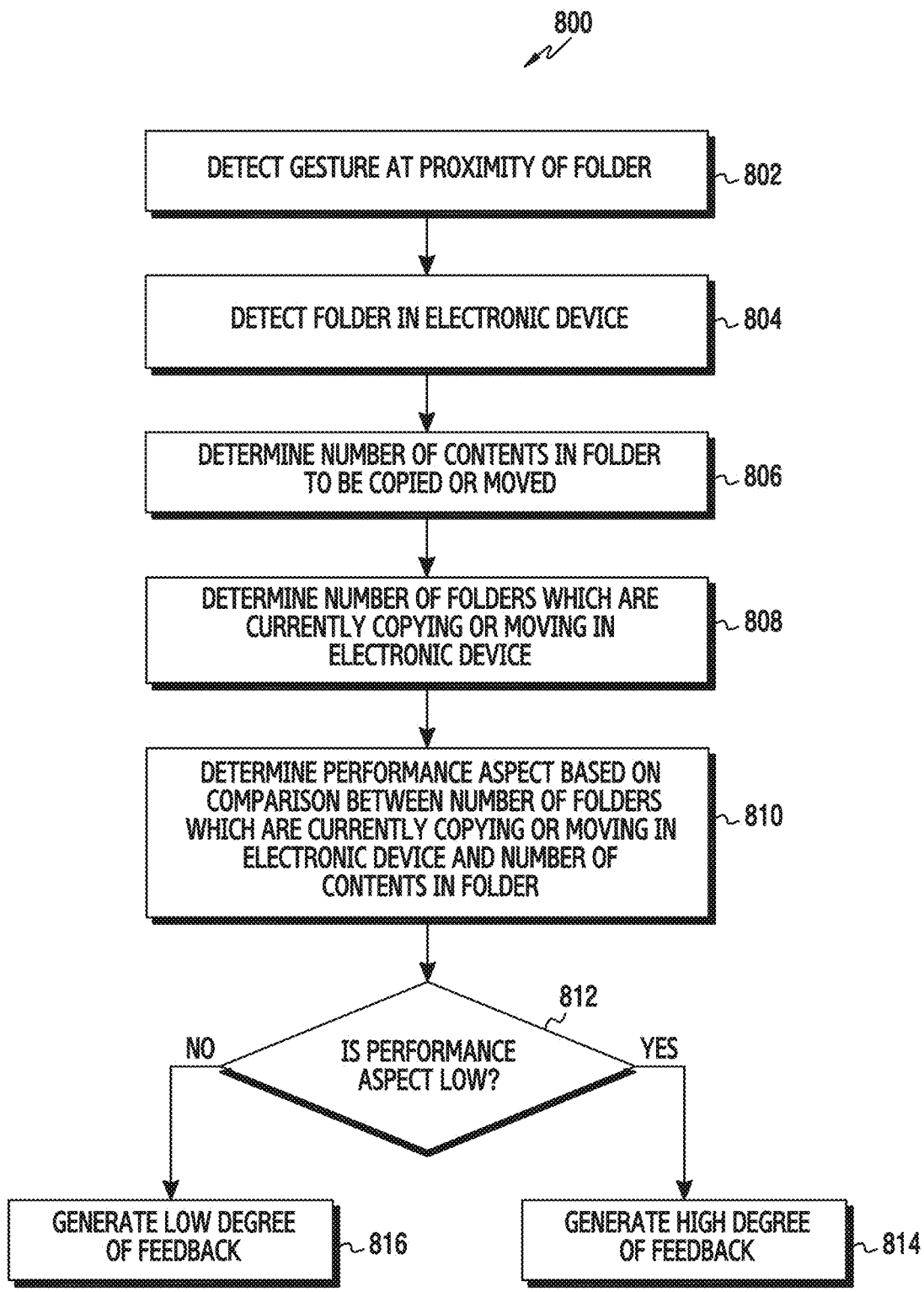
FIG. 8 is a flow diagram illustrating a method for providing feedback while moving number of folders from one location to another location, according to embodiments as disclosed herein.

FIG. 8 is a flow diagram illustrating a method 800 for providing feedback while moving number of folders from one location to another location, according to embodiments as disclosed herein.

At step 802, the method 800 includes detecting the gesture at the proximity of the folder in the electronic device 100. The method 800 allows the gesture detection unit 102 to detect the gesture at the proximity of the folder in the electronic device 100. The electronic device 100 detects the gesture at the proximity of the folder in the electronic device 100. At step 804, the method 800 includes detecting the folder in the electronic device 100. The method 800 allows the controlling unit 104 to detect the folder in the electronic device 100. The electronic device 100 detects the folder in the electronic device 100.

At step 806, the method 800 includes determining the number of contents in the folder to be copied or moved. The method 800 allows the controlling unit 104 to determine the number of contents in the folder to be copied or moved. The electronic device 100 determines the number of contents in the folder to be copied or moved.

At step 808, the method 800 includes determining the number of folders which are currently undergoing copying or moving in the electronic device 100. The method 800 allows the controlling unit 104 to determine the number of folders which are currently undergoing copying or moving in the electronic device 100. The electronic device 100 determines the number of folders which are currently undergoing copying or moving in the electronic device 100.

At step 810, the method 800 includes determining the performance aspect based on a comparison between the number of folders which are currently copying or moving in the electronic device 100 and the number of contents in the folder to be copied or moved. The method 800 allows the controlling unit 104 to determine the performance aspect based on a comparison between number of folders which are currently copying or moving in the electronic device 100 and the number of contents in the folder to be copied or moved. The electronic device 100 determines the performance aspect based on a comparison between number of folders which are currently copying or moving in the electronic device 100 and the number of contents in the folder to be copied or moved.

If it is determined, at step 812, that the performance aspect is low, then at step 814, the method 800 includes generating the high degree of feedback even when the number of contents in the folder is less. The method 800 allows the feedback generating unit 106 to generate the high degree of feedback even when the number of contents in the folder is less. The electronic device 100 generates the high degree of feedback even when the number of contents in the folder is less. If it is determined, at step 812, that the performance aspect is not low, then at step 816, the method 800 includes generating the low degree of feedback even when the number of contents in the folder is more. The method 800 allows the feedback generating unit 106 to generate the low degree of feedback even when the number of contents in the folder is more. The electronic device 100 generates the low degree of feedback even when the number of contents in the folder is more.

In an embodiment, the performance aspect with a threshold (T) level of "T" related to the number of files/folders which are currently copying or moving in the electronic device 100, may be defined. The threshold may be defined to assess the impact of the file storage in the available memory. If it is assessed that the impact of the copying/moving of the content in the folder will be such that the count of total number of files/content being copied/moved simultaneously exceeds the threshold T, a high degree of feedback may be generated by the feedback generating unit 106. Further, the user may receive the feedback for certain duration.

In an embodiment, the high degree of feedback is generated when the number of contents in the folder is less and when the number of folders which are currently undergoing copying or moving are more. In another embodiment, the low degree of feedback is generated when the number of contents in the folder is less and when the number of folders which are currently undergoing copying or moving are less.

The various actions, acts, blocks, steps, or the like in the method 800 may be performed in the order presented, in a different order or simultaneously. Further, in some embodiments, some of the actions, acts, blocks, steps, or the like may be omitted, added, modified, skipped, or the like without departing from the scope of the invention.

Figure 9:
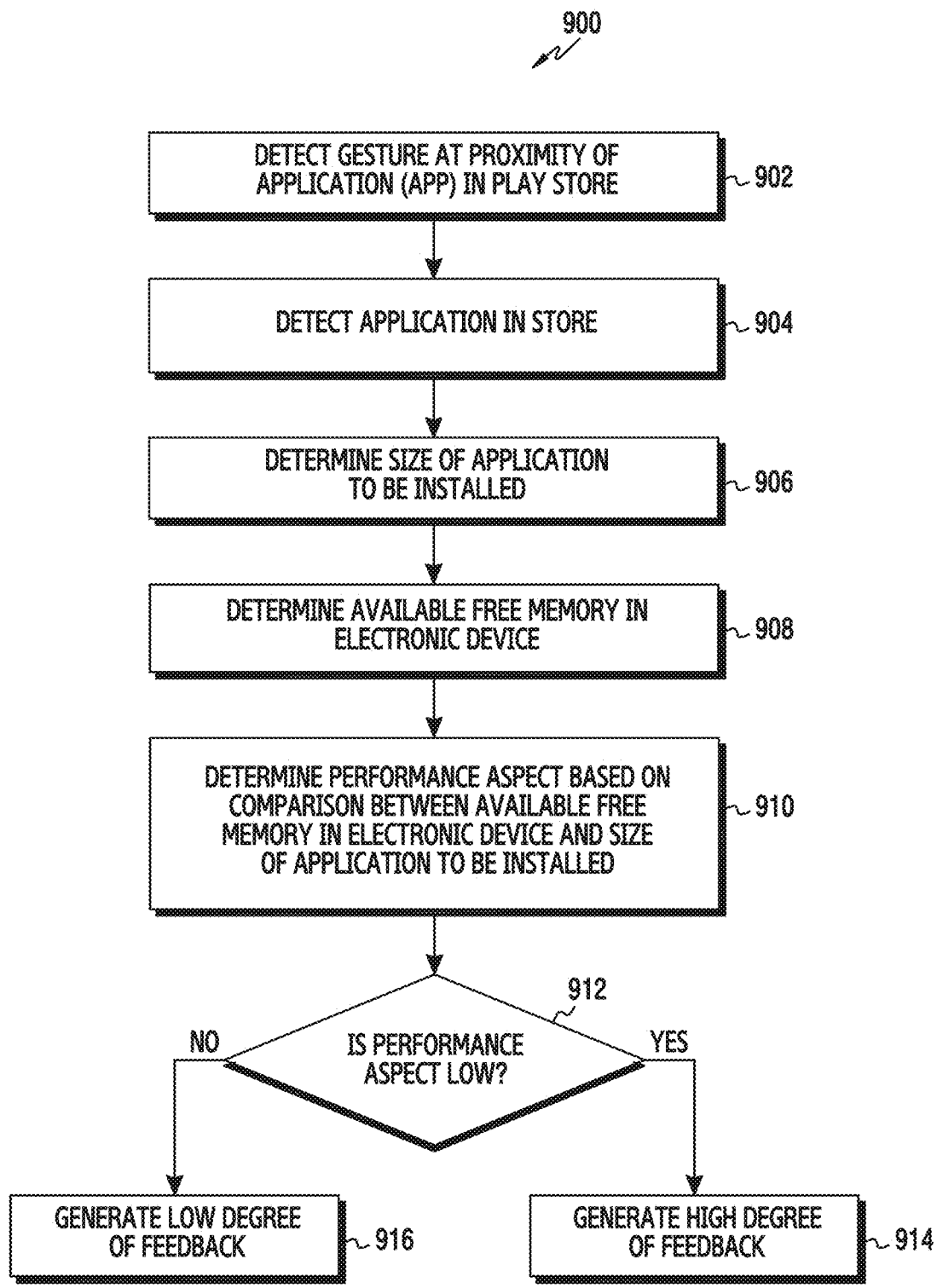
FIG. 9 is a flow diagram illustrating a method for providing feedback while installing an application from a play store, according to embodiments as disclosed herein.

FIG. 9 is a flow diagram illustrating a method 900 for providing feedback while installing the application from the play store, according to embodiments as disclosed herein.

At step 902, the method 900 includes detecting the gesture at the proximity of the application in the play store. The method 900 allows the gesture detection unit 102 to detect the gesture at the proximity of the application in the play store. The electronic device 100 detects the gesture at the proximity of the application in the play store. At step 904, the method 900 includes detecting the application in the store. The method 900 allows the controlling unit 104 to detect the application in the store. The electronic device 100 detects the application in the store.

At step 906, the method 900 includes determining the size of the application to be installed. The method 900 allows the controlling unit 104 to determine the size of the application to be installed. The electronic device 100 determines the size of the application to be installed. At step 908, the method 900 includes determining the available free memory in the electronic device 100. The method 900 allows the controlling unit 104 to determine the available free memory in the electronic device 100. The electronic device 100 determines the available free memory in the electronic device 100.

At step 910, the method 900 includes determining the performance aspect based on a comparison between the available free memory in the electronic device 100 and the size of the application to be installed. The method 600 allows the controlling unit 104 to determine the performance aspect based on a comparison between the available free memory in the electronic device 100 and the size of the application to be installed. The electronic device 100 determines the performance aspect based on a comparison between the available free memory in the electronic device 100 and the size of the application to be installed.

If it is determined, at step 912, that the performance aspect is low, then at step 914, the method 900 includes generating the high degree of feedback even when the size of the application to be installed is less. The method 900 allows the feedback generating unit 106 to generate the high degree of feedback even when the size of the application to be installed is less. The electronic device 100 generates the high degree of feedback even when the size of the application to be installed is less. If it is determined, at step 912, that the performance aspect is not low, then at step 916, the method 900 includes generating the low degree of feedback even when the size of the application to be installed is more. The method 900 allows the feedback generating unit 106 to generate the low degree of feedback even when the size of the application to be installed is more. The electronic device 100 generates the low degree of feedback even when the size of the application to be installed is more.

In an embodiment, the performance aspect with a threshold (T), related to the available free memory in the electronic device 100 may be defined. The threshold may be defined to assess the impact of the application installation in the available memory. If it is assessed that the impact of application installation will be such that the total available memory after the installation of the application is reduced below the threshold T, a high degree of feedback may be generated by the feedback generating unit 106, indicating a low performance aspect. Further, the user may receive the feedback for certain duration.

The various actions, acts, blocks, steps, or the like in the method 900 may be performed in the order presented, in a different order or simultaneously. Further, in some embodiments, some of the actions, acts, blocks, steps, or the like may be omitted, added, modified, skipped, or the like without departing from the scope of the invention.

Figure 10:
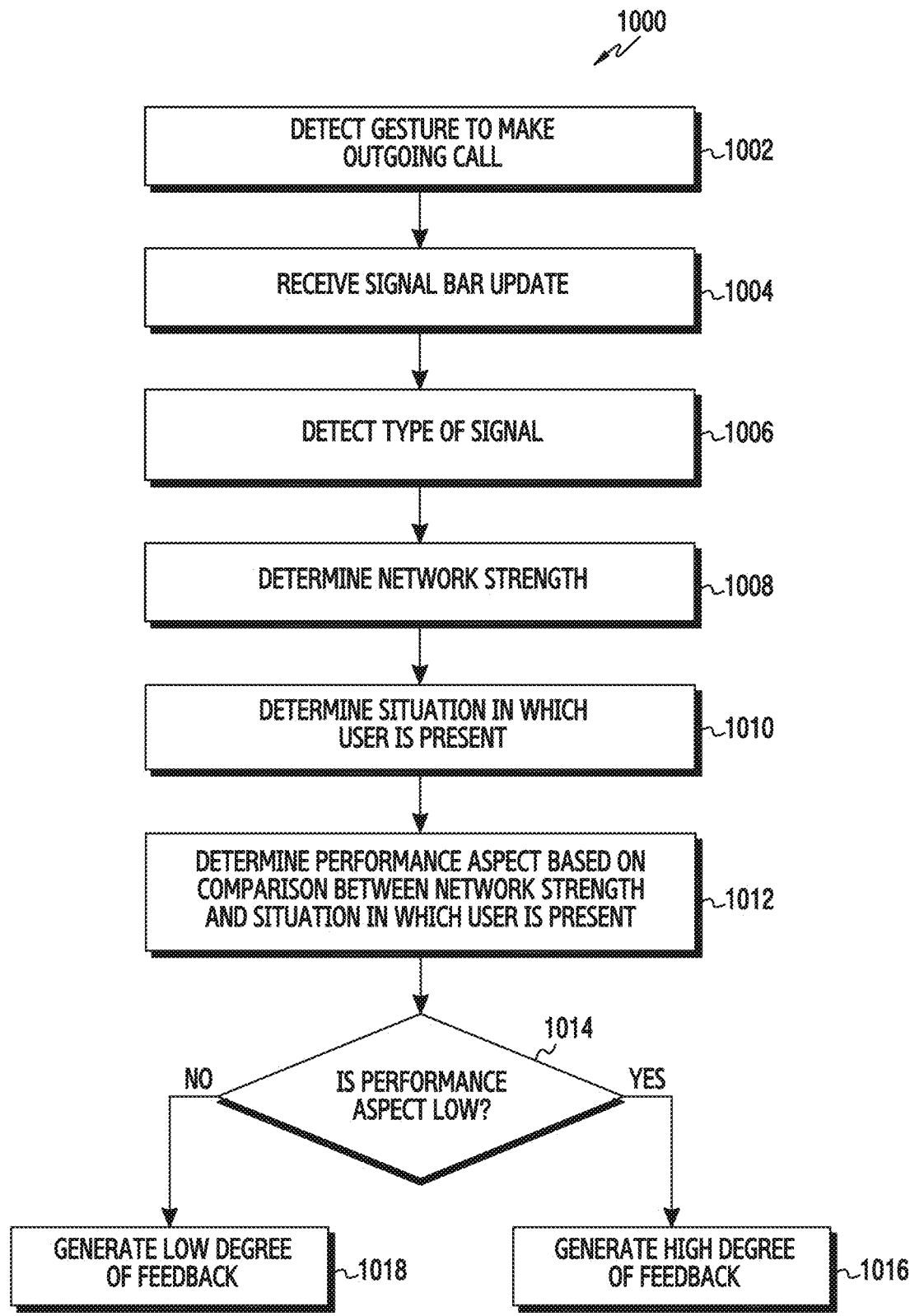
FIG. 10 is a flow diagram illustrating a method for providing feedback during receiving a signal bar update, according to embodiments as disclosed herein.

FIG. 10 is a flow diagram illustrating a method 1000 for providing feedback during receiving the signal bar update, according to embodiments as disclosed herein.

At step 1002, the method 1000 includes detecting a gesture to make an outgoing call. The method 1000 allows the gesture detection unit 102 to detect the gesture to make the outgoing call. The electronic device 100 detects the gesture to make the outgoing call.

At step 1004, the method 1000 includes receiving a signal bar update. The method 1000 allows the communication unit 110 to receive the signal bar update. The electronic device 100 receives the signal bar update. At step 1006, the method 1000 includes detecting type of the signal. The method 1000 allows the controlling unit 104 to detect the type of the signal. The electronic device 100 detects the type of the signal.

At step 1008, the method 1000 includes determining the network strength. The method 1000 allows the controlling unit 104 to determine the network strength. The electronic device 100 determines the network strength. At step 1010, the method 1000 includes determining a situation in which the user is present. The method 1000 allows the controlling unit 104 to determine a situation in which the user is present. The electronic device 100 determines a situation in which the user is present.

At step 1012, the method 1000 includes determining the performance aspect based on a comparison between the network strength and the situation in which the user is present. The method 1000 allows the controlling unit 104 to determine the performance aspect based on a comparison between network strength and the situation in which the user is present. The electronic device 100 determines the performance aspect based on a comparison between network strength and the situation in which the user is present.

If it is determined, at step 1014, that the performance aspect is low, then at step 1016, the method 1000 includes generating the high degree of feedback. The method 1000 allows the feedback generating unit 106 to generate the high degree of feedback. The electronic device 100 generates the high degree of feedback. If it is determined, at step 1014, that the performance aspect is not low, then at step 1018, the method 1000 includes generating low degree of feedback. The method 1000 allows the feedback generating unit 106 to generate the low degree of feedback. The electronic device 100 generates the low degree of feedback. In an embodiment, during emergency situation even in case of the low network strength the feedback generated will be low because the urgency of placing a call may be high and even a low network strength may at least give a high performance by helping the user to place the emergency call.

In an embodiment, the performance aspect related to a network strength threshold (T), for the network strength of the electronic device 100 may be defined. If the network strength is low (i.e., below T) and electronic device 100 is in non-emergency mode, then the controlling unit 104 may generate the high degree of feedback, indicating that the performance aspect is low. Further, when the network strength is low (i.e., below T) and the electronic device 100 is in emergency mode, then the feedback generating unit 106 may generate the low degree of feedback, indicating that the performance aspect is high. Further, the user may receive the feedback for certain duration.

The various actions, acts, blocks, steps, or the like in the method 1000 may be performed in the order presented, in a different order or simultaneously. Further, in some embodiments, some of the actions, acts, blocks, steps, or the like may be omitted, added, modified, skipped, or the like without departing from the scope of the invention.

Figure 11:
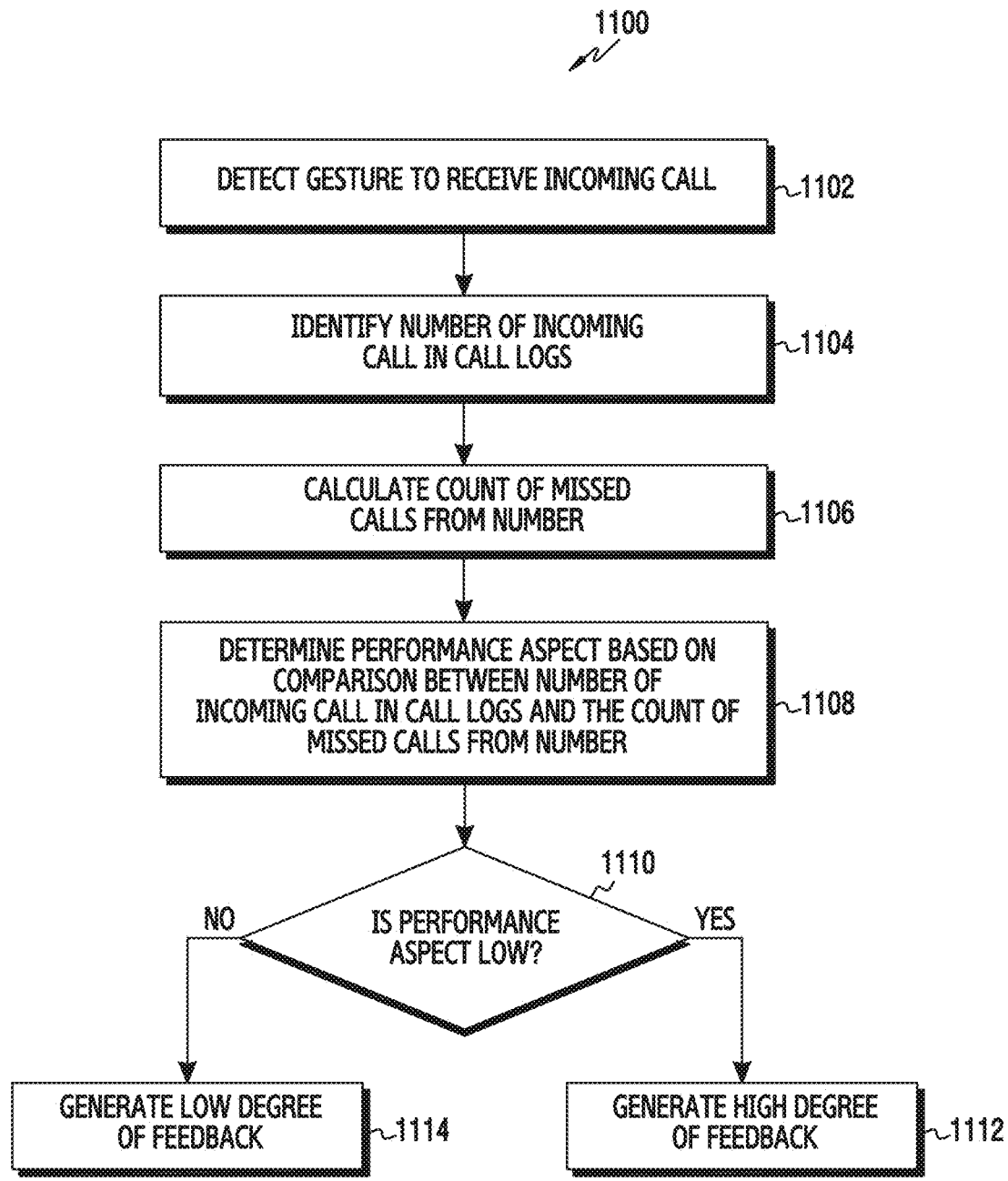
FIG. 11 is a flow diagram illustrating a method for providing feedback while receiving an incoming call, according to embodiments as disclosed herein.

FIG. 11 is a flow diagram illustrating a method 1100 for providing feedback based on performance of the electronic device 100 while receiving the incoming call, according to embodiments as disclosed herein. At step 1102, the method 1100 includes detecting a gesture to receive the incoming call. The method 1100 allows the gesture detection unit 102 to detect the gesture to receive the incoming call. The electronic device 100 detects the gesture to receive the incoming call.

At step 1104, the method 1100 includes identifying the number of the incoming call in call logs. The method 1100 allows the controlling unit 104 to identify the number of the incoming call in call logs. The electronic device 100 identifies the number of the incoming call in call logs. At step 1106, the method 1100 includes calculating the count of missed calls from the number of the incoming call. The method 1100 allows the controlling unit 104 to calculate the count of missed calls from the number of the incoming call. The electronic device 100 calculates the count of missed calls from the number of the incoming call.

At step 1108, the method 1100 includes determining the performance aspect based on a comparison between the number of the incoming call in call logs and the count of missed calls from the number. The method 1100 allows the controlling unit 104 to determine the performance aspect based on a comparison between the number of the incoming call in call logs and the count of missed calls from the number. The electronic device 100 determines the performance aspect based on a comparison between the number of the incoming call in call logs and the count of missed calls from the number.

If it is determined, at step 1110, that the performance aspect is low, then at step 1112, the method 1100 includes generating the high degree of feedback and may keep on increasing with the increase in number of missed calls. The method 1100 allows feedback generating unit 106 to generate the high degree of feedback and may keep on increasing with the increase in number of missed calls. The electronic device 100 generates the high degree of feedback and may keep on increasing with the increase in number of missed calls. If it is determined, at step 1110, that the performance aspect is not low, then at step 1114, the method 1100 includes generating the low degree of feedback. The method 1100 allows feedback generating unit 106 to generate the low degree of feedback. The electronic device 100 generates the low degree of feedback.

In an embodiment, the performance aspect with a threshold (T), related to the number of the incoming calls in call log may be defined. If it is determined that the ratio of number of missed calls to number of incoming calls within a day is greater than T, then the feedback generating unit 106 may generate the high degree of feedback, indicating that the performance aspect is low. This in turn informs the user that he should check the call logs for missed call. Further, the user may receive the feedback for certain duration.

The various actions, acts, blocks, steps, or the like in the method 1100 may be performed in the order presented, in a different order or simultaneously. Further, in some embodiments, some of the actions, acts, blocks, steps, or the like may be omitted, added, modified, skipped, or the like without departing from the scope of the invention.

Figure 12:
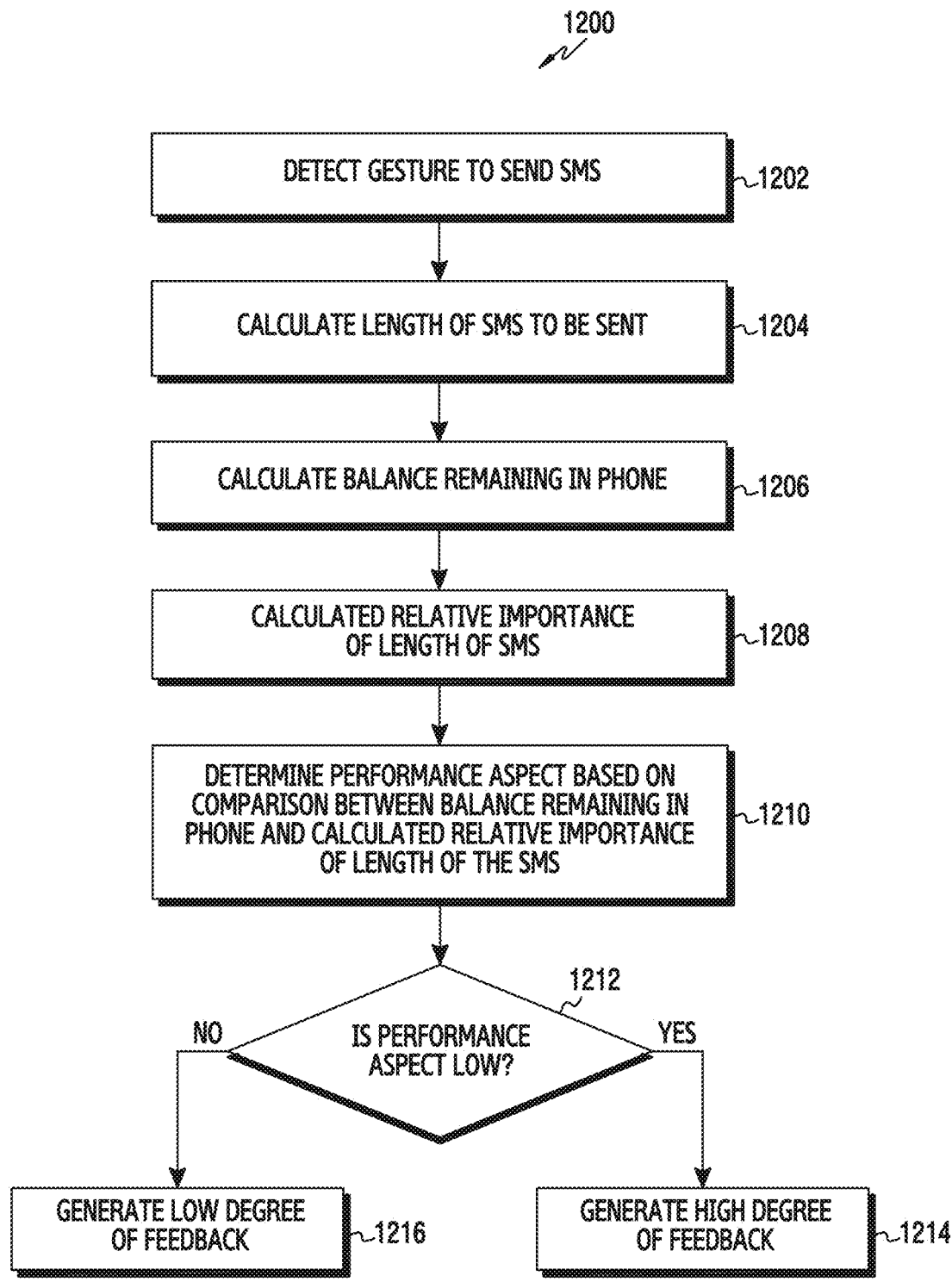
FIG. 12 is a flow diagram illustrating a method for providing feedback while sending a Short Messaging Service (SMS), according to embodiments as disclosed herein.

FIG. 12 is a flow diagram illustrating a method 1200 for providing feedback based on performance of the electronic device 100 while sending a Short Messaging Service (SMS), according to embodiments as disclosed herein.

At step 1202, the method 1200 includes detecting a gesture to send the SMS. The method 1200 allows the gesture detection unit 102 to detect the gesture to send the SMS. The electronic device 100 detects the gesture to send the SMS. At 1204, the method 1200 includes calculating length of the SMS to be sent. The method 1300 allows the controlling unit 104 to calculate the length of the SMS to be sent. The electronic device 100 calculates the length of the SMS to be sent.

At 1206, the method 1200 includes calculating the balance of the phone. The method 1200 allows the controlling unit 104 to calculate the balance of the phone. The electronic device 100 calculates the balance of the phone. At step 1208, the method 1200 includes calculating the relative importance of the length of the SMS. The method 1200 allows the controlling unit 104 to calculate the relative importance of the length of the SMS. The electronic device 100 calculates the relative importance of the length of the SMS.

At step 1210, the method 1200 includes determining the performance aspect based on a comparison between the balance remaining in the phone and the calculated relative importance of the length of the SMS. The method 1200 allows the controlling unit 104 to determine the performance aspect based on a comparison between the balance remaining in the phone and the calculated relative importance of the length of the SMS. The electronic device 100 determines the performance aspect based on a comparison between the balance remaining in the phone and the calculated relative importance of the length of the SMS.

If it is determined, at step 1212, that the performance aspect is low, then at step 1214, the method 1200 includes generating the high degree of feedback when the length of the SMS to be sent is short. If it is determined, at step 1212, that the performance aspect is not low, then at step 1214, the method 1200 includes generating the low degree of feedback when the length of the SMS to be sent is long.

In an embodiment, the performance aspect with a threshold (T), related to the balance remaining in the phone may be defined. The threshold may be defined to assess the impact of the sending of SMS on the balance remaining in the phone. If it is assessed that the impact of sending of SMS will be such that the remaining balance in the phone will reduce below the threshold T, a high degree of feedback may be generated by the feedback generating unit 106, indicating a low performance aspect.

In an embodiment, during sending of the SMS, the user may experience degree of feedback depending upon the balance remaining in the phone. For example, the long SMS may produce high degree of feedback and the short SMS may produce low degree of feedback.

The various actions, acts, blocks, steps, or the like in the method 1200 may be performed in the order presented, in a different order or simultaneously. Further, in some embodiments, some of the actions, acts, blocks, steps, or the like may be omitted, added, modified, skipped, or the like without departing from the scope of the invention.

Figure 13:
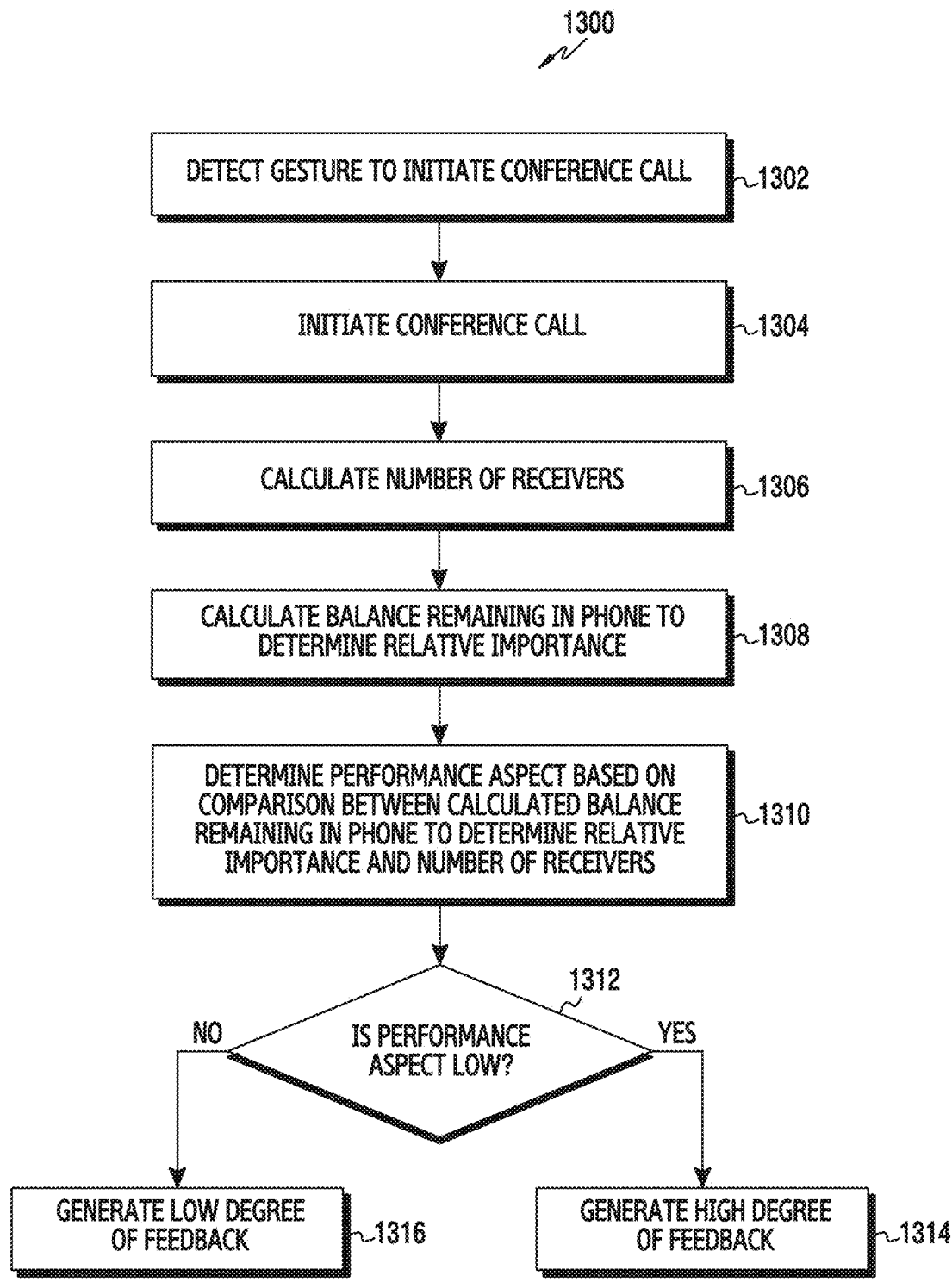
FIG. 13 is a flow diagram illustrating a method for providing feedback while the user tries to make a conference call, according to embodiments as disclosed herein.

FIG. 13 is a flow diagram illustrating a method 1300 for providing feedback based on performance of the electronic device 100 while the user tries to make a conference call, according to embodiments as disclosed herein.

At step 1302, the method 1300 includes detecting the gesture to initiate the conference call. The method 1300 allows the gesture detection unit 102 to detect the gesture to initiate the conference call. At step 1304, the method 1300 includes initiating the conference call. The method 1300 allows the controlling unit 104 to initiate the conference call. The electronic device 100 initiates the conference call.

At step 1306, the method 1300 includes calculating the number of receivers. The method 1300 allows the controlling unit 104 to calculate the number of receivers. The electronic device 100 calculates the number of receivers. At step 1308, the method 1300 includes calculate balance remaining in the phone to determine the relative importance. The method 1300 allows the controlling unit 104 to calculate balance remaining in the phone to determine the relative importance. The electronic device 100 calculates balance remaining in the phone to determine the relative importance. For example, consider a scenario in which a user tries to initiate a conference call with a family group consisting of three persons and the conference call is initiated by connecting with two persons from the group. If the user tries to add the third person into the conference call when the balance remaining in the phone is low, then the controlling unit 104 may determines a high relative importance of the third person as the person belong to the user family group.

At step 1310, the method 1300 includes determining the performance aspect based on a comparison between the calculated balance remaining in phone to determine relative importance and the number of receivers. The method 1300 allows the controlling unit 104 to determine the performance aspect based on a comparison between the calculated balance remaining in phone to determine relative importance and the number of receivers. The electronic device 100 determines the performance aspect based on a comparison between the calculated balance remaining in phone to determine relative importance and the number of receivers.

If it is determined, at step 1312, that the performance aspect is low, then at step 1314, the method 1300 includes generating the high degree of feedback even when the user tries to initiate the conference call with less number of receivers. The method 1300 allows the feedback generating unit 106 to generate the high degree of feedback even when the user tries to initiate the conference call with less number of receivers. The electronic device 100 generates the high degree of feedback even when the user tries to initiate the conference call with less number of receivers. If it is determined, at step 1312, that the performance aspect is not low, then at step 1316, the method 1300 includes generating the low degree of feedback even when the user tries to initiate the conference call with less number of receivers. The method 1300 allows the feedback generating unit 106 to generate the low degree of feedback when the user tries to initiate the conference call with less number of receivers. The electronic device 100 generates the low degree of feedback when the user tries to initiate the conference call with less number of receivers.

In an embodiment, the performance aspect with a threshold (T), related to the balance remaining in the phone may be defined. The threshold may be defined to assess the impact of adding another member in the conference based on the balance remaining in the phone. If it is assessed that the impact of adding another member will be such that the remaining balance in the phone will reduce below the threshold T, a high degree of feedback may be generated by the feedback generating unit 106, indicating a low performance aspect. In another embodiment, a weighted average of estimated call cost may be assessed for each caller in the conference, where the weight is assigned on the basis of relative importance of the receivers. If it is determined that the weighted average of the estimated call cost will exceed the threshold T, a high degree of feedback may be generated indication that the performance aspect is low. The estimate for call cost for each user may be derived using historical usage information. Further, the user may receive the feedback for certain duration.

In an embodiment, the high degree of feedback is generated when the user tries to make the conference call with more number of receivers.

The various actions, acts, blocks, steps, or the like in the method 1300 may be performed in the order presented, in a different order or simultaneously. Further, in some embodiments, some of the actions, acts, blocks, steps, or the like may be omitted, added, modified, skipped, or the like without departing from the scope of the invention.

Figure 14:
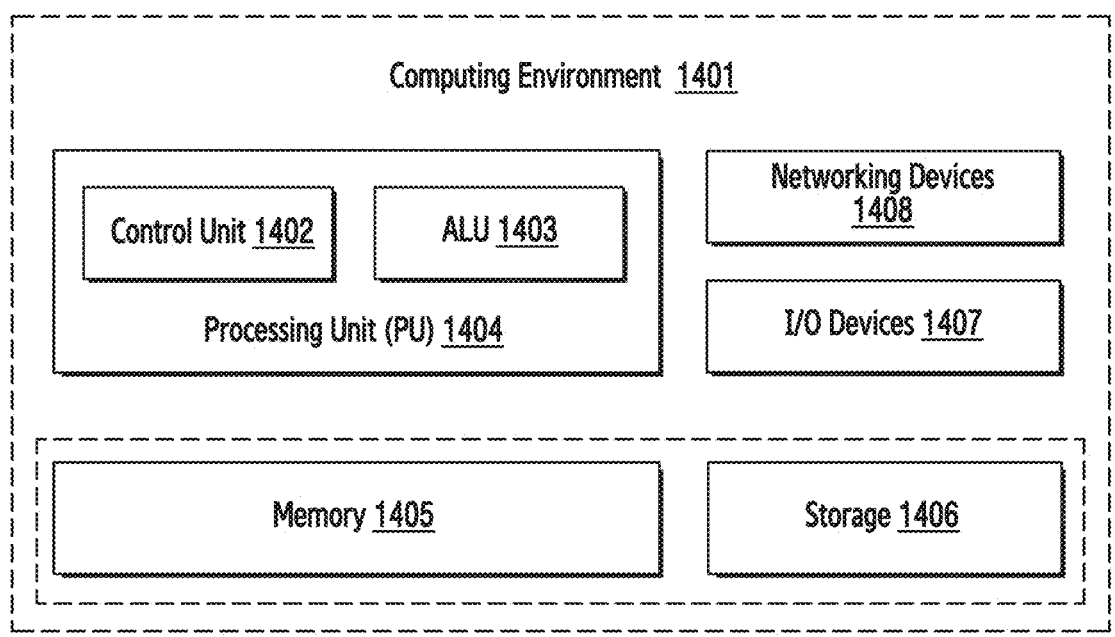
FIG. 14 illustrates a computing environment implementing the method for providing feedback based on performance of the electronic device, according to embodiments as disclosed herein.

FIG. 14 illustrates a computing environment implementing the method for providing feedback based on performance of the electronic device 100, according to embodiments as disclosed herein. As depicted in the figure, the computing environment 1401 comprises at least one processing unit 1404 that is equipped with a control unit 1402 and an Arithmetic Logic Unit (ALU) 1403, a memory 1405, a storage unit 1406, plurality of networking devices 1408 and a plurality Input output (I/O) devices 1407. The processing unit 1404 is responsible for processing the instructions of the technique. The processing unit 1404 receives commands from the control unit in order to perform its processing. Further, any logical and arithmetic operations involved in the execution of the instructions are computed with the help of the ALU 1403.

The overall computing environment 1401 can be composed of multiple homogeneous and/or heterogeneous cores, multiple CPUs of different kinds, special media and other accelerators. The processing unit 1404 is responsible for processing the instructions of the technique. Further, the plurality of processing units 1404 may be located on a single chip or over multiple chips.

The technique comprising of instructions and codes required for the implementation are stored in either the memory unit 1405 or the storage 1406 or both. At the time of execution, the instructions may be fetched from the corresponding memory 1405 or storage 1406, and executed by the processing unit 1404.

In case of any hardware implementations various networking devices 1408 or external I/O devices 1407 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 14 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for operating an electronic device, the method comprising:
    detecting a gesture performed in the electronic device;
    identifying an item including a web page which is indicated by the gesture;
    identifying at least one quantitative parameter associated with the web page, the at least one quantitative parameter including a size of the web page to be loaded;
    determining a performance aspect of the electronic device based on a comparison between the at least one quantitative parameter and at least one relative parameter for a current state of the electronic device related to the at least one quantitative parameter;
    determining a degree of the performance aspect based on a comparison between a predetermined threshold and the performance aspect; and
    generating a feedback with at least one of an intensity, a duration or a pattern, wherein the at least one of the intensity, the duration or the pattern is determined in accordance to the degree of the performance aspect in response to the gesture,
    wherein the at least one relative parameter includes available data bandwidth to load the web page,
    wherein the feedback is generated with at least one of a first intensity, a first duration or a first pattern in response to determining the degree of the performance aspect as high performance, and
    wherein the feedback is generated with at least one of a second intensity, a second duration or a second pattern that is different from the at least one of the first intensity, the first duration or the first pattern in response to determining the degree of the performance aspect as low performance.

2. The method of claim 1, wherein the determining of the performance aspect based on the comparison comprises identifying the at least one relative parameter of the electronic device related to the at least one quantitative parameter based on the current state of the electronic device.

3. The method of claim 2, wherein the feedback comprises at least one of a haptic feedback, a tactile feedback, an audio feedback, a visual feedback, an alert or a notification.

4. The method of claim 3, wherein the feedback is selected based on the at least one relative parameter.

5. The method of claim 1,
    wherein the feedback indicates a change in a state of the electronic device with respect to the item, and
    wherein the degree varies in at least one of intensity, pattern, duration or profile based on the at least one quantitative parameter.

6. An electronic device comprising:
    a gesture detection unit configured to detect a gesture performed in the electronic device;
    a controlling unit configured to:
        identify an item including a web page which is indicated by the gesture,
        identify at least one quantitative parameter associated with the web page, the at least one quantitative parameter including a size of the web page to be loaded,
        determine a performance aspect of the electronic device based a comparison between the at least one quantitative parameter and at least one relative parameter for a current state of the electronic device related to the at least one quantitative parameter, and determine a degree of the performance aspect based on a comparison between a predetermined threshold and the performance aspect; and a feedback generating unit configured to generate feedback with at least one of an intensity, a duration or a pattern, wherein the at least one of the intensity, the duration or the pattern is determined in accordance to the degree of the performance aspect in response to the gesture, wherein the at least one relative parameter includes available data bandwidth to load the web page, wherein the feedback is generated with at least one of a first intensity, a first duration or a first pattern in response to determining the degree of the performance aspect as high performance, and wherein the feedback is generated with at least one of a second intensity, a second duration or a second pattern that is different from the at least one of the first intensity, the first duration or the first pattern in response to determining the degree of the performance aspect as low performance.

7. The electronic device of claim 6, wherein the controlling unit is further configured to identify the at least one relative parameter of the electronic device related to the at least one quantitative parameter based on the current state of the electronic device.

8. The electronic device of claim 7, wherein the feedback comprises at least one of a haptic feedback, a tactile feedback, an audio feedback, a visual feedback, an alert or a notification.

9. The electronic device of claim 8, wherein the feedback is selected based on the at least one relative parameter of the electronic device.

10. The electronic device of claim 6,
wherein the feedback indicates change in a state of the electronic device with respect to the item, and
wherein the degree varies in at least one of intensity, pattern, duration or profile based on the at least one quantitative parameter.

11. A computer program product comprising computer executable program code recorded on a computer readable non-transitory storage medium, the computer executable program code when executed causing actions including:

detecting a gesture performed in the electronic device;

identifying an item including a web page which is indicated by the gesture;

identifying at least one quantitative parameter associated with the web page, the at least one quantitative parameter including a size of the web page to be loaded;

determining a performance aspect of the electronic device based on a comparison between the at least one quantitative parameter and at least one relative parameter for a current state of the electronic device related to the at least one quantitative parameter;

determining a degree of the performance aspect based on a comparison between a predetermined threshold and the performance aspect; and generating a feedback with at least one of an intensity, a duration or a pattern, wherein the at least one of the intensity, the duration or the pattern is determined in accordance to the degree of the performance aspect in response to the gesture, wherein the at least one relative parameter includes available data bandwidth to load the web page, wherein the feedback is generated with at least one of a first intensity, a first duration or a first pattern in response to determining the degree of the performance aspect as high performance, and wherein the feedback is generated with at least one of a second intensity, a second duration or a second pattern that is different from the at least one of the first intensity, the first duration or the first pattern in response to determining the degree of the performance aspect as low performance.

* * * * *